United States Patent
Bekiares et al.

(10) Patent No.: US 8,681,981 B2
(45) Date of Patent: Mar. 25, 2014

(54) METHOD AND APPARATUS FOR TRANSMITTING VOICE COMMUNICATIONS RELATED TO A MULTIMEDIA SESSION

(75) Inventors: Tyrone D. Bekiares, Chicago, IL (US);
Peter E. Thomas, Schaumburg, IL (US);
Ryan P. Ziolko, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 180 days.

(21) Appl. No.: 12/959,442

(22) Filed: Dec. 3, 2010

(65) Prior Publication Data
US 2012/0140925 A1 Jun. 7, 2012

(51) Int. Cl.
*H04K 1/00* (2006.01)
*H04L 29/06* (2006.01)
*H04W 12/02* (2009.01)
*H04L 9/08* (2006.01)

(52) U.S. Cl.
CPC .......... *H04L 63/0428* (2013.01); *H04W 12/02* (2013.01); *H04L 9/08* (2013.01)
USPC ............................. 380/255; 380/270; 713/160

(58) Field of Classification Search
USPC ........... 380/255, 270; 713/150, 160; 455/403, 455/410
See application file for complete search history.

(56) References Cited

U.S. PATENT DOCUMENTS

| | | | | |
|---|---|---|---|---|
| 5,185,796 A | * | 2/1993 | Wilson | 380/277 |
| 5,825,889 A | * | 10/1998 | Dent | 380/270 |
| 6,879,671 B2 | * | 4/2005 | Schmid et al. | 379/189 |
| 7,093,129 B1 | * | 8/2006 | Gavagni et al. | 713/175 |
| 7,949,677 B2 | * | 5/2011 | Croft et al. | 709/219 |
| 2002/0018571 A1 | * | 2/2002 | Anderson et al. | 380/277 |
| 2002/0055366 A1 | * | 5/2002 | Maggenti et al. | 455/517 |
| 2005/0149730 A1 | * | 7/2005 | Aissi et al. | 713/168 |
| 2005/0175184 A1 | * | 8/2005 | Grover et al. | 380/278 |
| 2005/0190740 A1 | * | 9/2005 | Zhao et al. | 370/349 |
| 2005/0267942 A1 | * | 12/2005 | Quinn et al. | 709/206 |

(Continued)

FOREIGN PATENT DOCUMENTS

| | | | |
|---|---|---|---|
| EP | 1569473 A1 | * | 8/2005 |
| JP | 10079728 A | * | 3/1998 |

(Continued)

OTHER PUBLICATIONS

Bian, Jiang, et al., "A Role-based Secure Group Communication Framework", IEEE International Conference on System of Systems Engineering, Jun. 2-4, pp. 1-6.*

(Continued)

*Primary Examiner* — Andrew L Nalven
*Assistant Examiner* — Walter Malinowski
(74) *Attorney, Agent, or Firm* — Steven A. May (57) ABSTRACT

A method and apparatus for transmitting a subset voice stream associated with a subset talk group. A voice communication device receives a session identifier from an associated data communication device engaged. The voice communication device transforms the session identifier into a session key identifier, obtains an encryption algorithm implementing a subset talk group filtering feature and a voice encryption key identifier, and combines the session key identifier with the voice encryption key identifier to generate a signaling key identifier. The voice communication device associates the signaling key identifier and an encryption algorithm identifier with the subset voice stream during transmission of the subset voice stream to a receiving voice communication device.

20 Claims, 4 Drawing Sheets

(56) References Cited

U.S. PATENT DOCUMENTS

| | | | |
|---|---|---|---|
| 2006/0047820 A1* | 3/2006 | Sung et al. | 709/227 |
| 2006/0133372 A1* | 6/2006 | Cheong et al. | 370/389 |
| 2007/0058809 A1* | 3/2007 | Ingels et al. | 380/203 |
| 2007/0058815 A1* | 3/2007 | Kwak et al. | 380/286 |
| 2007/0083750 A1* | 4/2007 | Miura et al. | 713/155 |
| 2007/0171848 A1* | 7/2007 | Fujii et al. | 370/310 |
| 2008/0089517 A1* | 4/2008 | Bianco et al. | 380/259 |
| 2008/0229110 A1* | 9/2008 | Balfanz et al. | 713/176 |
| 2009/0059831 A1* | 3/2009 | Li et al. | 370/312 |
| 2009/0147958 A1* | 6/2009 | Calcaterra et al. | 380/260 |
| 2009/0177894 A1* | 7/2009 | Orsini et al. | 713/193 |
| 2009/0232139 A1* | 9/2009 | Kelley | 370/392 |
| 2011/0055192 A1* | 3/2011 | Tang et al. | 707/706 |
| 2011/0150219 A1* | 6/2011 | Newberg et al. | 380/255 |

FOREIGN PATENT DOCUMENTS

| | | | |
|---|---|---|---|
| KR | 10-2008-0065421 | * | 7/2008 |
| WO | 2005101697 A1 | | 10/2005 |
| WO | WO 2005101697 A1 * | | 10/2005 |
| WO | 2009032089 A1 | | 3/2009 |
| WO | WO 2009032089 A1 * | | 3/2009 |

OTHER PUBLICATIONS

P25 Standard Training Guide, TG-001, Daniels Electronics, Ltd., 43 Erie Street, Victoria, British Columbia, Canada V8V 1P8, 2004, 74 pages.*

International Search Report and Written Opinion for International Patent Application No. PCT/US2011/059945 mailed on Feb. 15, 2012.

Bian, J. et al., "A role based-secure group communication framework," IEEE International Conference on System of Systems Engineering, pp. 1-6, Jun. 2008.

* cited by examiner

METHOD AND APPARATUS FOR TRANSMITTING VOICE COMMUNICATIONS RELATED TO A MULTIMEDIA SESSION

FIELD OF THE DISCLOSURE

The present disclosure relates generally to transmitting voice communications using a voice communication device and more particularly to transmitting voice communications related to a multimedia session.

BACKGROUND

Institutional organizations, such as public safety organizations, typically use specialized voice communication systems to facilitate group discussions. Voice communication systems are typically embodied as narrowband radio systems which support low-bit-rate digital transmission of voice streams. An example of such a voice communication system is a Project 25-compatible two-way Push-To-Talk voice communication system which includes wireless and wired voice communication devices. The voice communication devices may be, for example, portable narrowband two-way radios, mobile radios, dispatch consoles, or other similar voice communication entities which communicate with one another via wired and/or wireless networks. Institutional organizations choose these types of voice communications systems because they provide high end-to-end voice quality, use advanced cryptography, enable centralized logging of calls, and are associated with low delay and high reliability. In addition, institutional users are familiar and comfortable with the user interface of these voice communication devices.

In addition to voice communications, institutional users may also share multimedia content, for example video media. The bandwidth requirements of multimedia content are generally greater than that provided by a voice communication system. Therefore, to transmit multimedia content, the institutional users may use data communication systems which are typically embodied as broadband radio systems. Broadband radio systems typically support high-bit-rate digital transmission of data streams, including real-time video. An example of such a data communication system is a wireless data network which operates in accordance with the Long Term Evolution (LTE) signaling standard and which includes wireless and wired data communication devices. The data communication devices may be, for example, smart phones, laptops, desktop computers, servers, dispatch consoles, or other similar data communication entities capable of participating in multimedia sessions and which communicate with one another via wired and/or wireless networks. Because data communication systems do not currently provide the same set of services to support voice communications that are available over dedicated voice communication systems, these institutional users typically use both the data communication system and the voice communication system at the same time. For example, these users are likely to discuss the content of a multimedia session, delivered over the data communication system to data. communication devices, using voice communication devices operating on the voice communication system.

Users of a voice communication system are typically grouped into logical talk groups to facilitate group discussion. Users operating voice communication devices can typically be joined to only one talk group at a time. As such, users typically select a talk group which will convey all voice communications relevant to their job function. This talk group is hereafter referred to as the users' primary talk group. Primary talk group membership, for example, may include all users typically operating in specific geographical area, such as a district or precinct. As such, the membership of primary talk groups is typically relatively large in size. The number of users concurrently viewing or sharing the same multimedia content by way of a multimedia session, on the other hand, is relatively small. When users whose voice communication devices are affiliated to a given primary talk group attempt to verbally discuss certain multimedia on the voice communication system, the resulting conversations may be distracting to those users whose voice communication devices are also affiliated to the same primary talk group, but who are not currently participating in the multimedia session.

Although institutional users may change the current talk group affiliation of their voice communication devices away from their primary talk group assignment, perhaps to a talk group whose membership includes the voice communication devices of only those users currently participating in a given multimedia session, a voice communication device associated with this secondary talk group selection may not continue to receive voice communications directed to the user's primary talk group. This may disrupt mission critical communications, such as resource dispatching. Furthermore, if the affiliation status of an institutional user's voice communication device is automatically changed to that of a secondary talk group, the user will unknowingly miss voice communications directed to their primary talk group. For at least these reasons, institutional users are hesitant to change their current talk group affiliation away from their primary talk group and prefer to reserve the use of secondary talk groups for highly specific scenarios.

Accordingly, there is a need for a method and apparatus for transmitting voice communications related to a multimedia session, without affecting a user's affiliation with a primary talk group.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present inven-

DETAILED DESCRIPTION

Embodiments are directed to apparatuses and methods for transmitting a subset voice stream associated with a subset talk group. A voice communication device receives a session identifier from an associated data communication device engaged in a multimedia session. The voice communication device transforms the session identifier into a session key identifier. The voice communication device then obtains, from an internal or external storage, an encryption algorithm implementing a subset talk group filtering feature and a voice encryption key identifier, and combines the session key identifier with the voice encryption key identifier to generate a signaling key identifier. The voice communication device associates the signaling key identifier and an encryption algorithm identifier with the subset voice stream during transmission of the subset voice stream to a receiving voice communication device. Upon receipt of the subset voice stream, the receiving voice communication device is configured to match the signaling key identifier and the encryption algorithm identifier with information stored on an internal or external storage associated with the receiving voice communication device. The receiving voice communication device is configured to present the subset voice stream to an associated user if there is a match or suppress presentation of the subset voice stream if there is no match.

Figure 1:
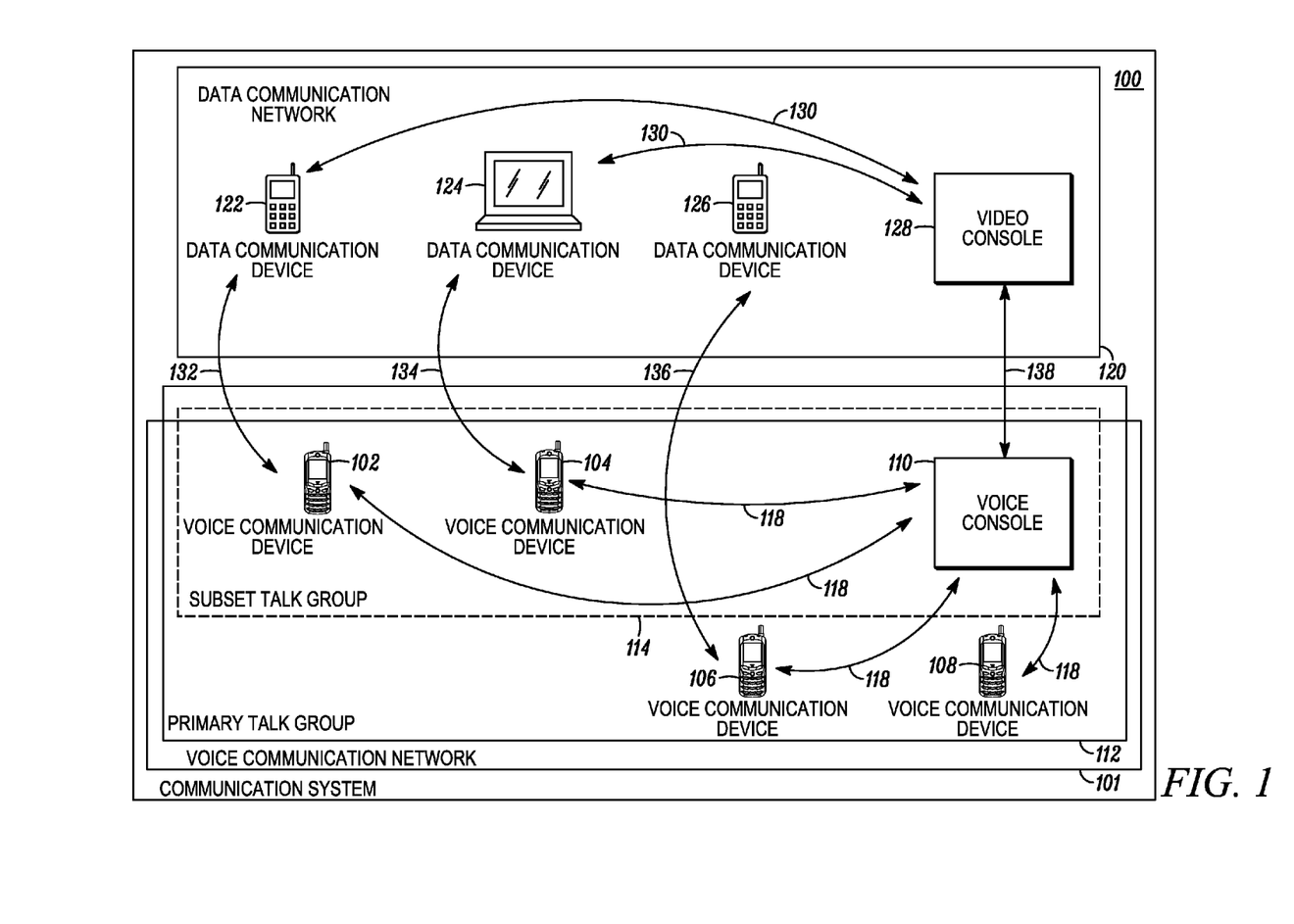
FIG. 1 illustrates a communication system used in accordance with some embodiments.

FIG. 1 illustrates a communication system used in accordance with some embodiments. Communication system 100 includes a voice communication network 101 and a data communication network 120. Both networks 101 and 120 may include one or more portable and mobile communication devices as well as fixed communication devices. Voice communication network 101 includes voice communication devices, such as radios 102-108 and voice console 110. Radios 102-108 may be, for example, portable two-way radios, mobile radios, or other similar portable or mobile voice communication devices. Voice console 110 may be, for example, a radio dispatch console, or a similar fixed voice communication device. Voice communication devices 102-110 are used to facilitate voice communications between users and are configured to optionally encrypt and decrypt voice streams. Each voice communication device 102-110 may transmit voice streams directly to other voice communication devices or through a repeater functionality (not shown) provided by voice communication network 101. Voice communication network 101 may operate in accordance with any standardized or proprietary digital voice communication protocol that provides for encryption, including, but not limited to, Project 25 (P25), Terrestrial Trunk Radio (TETRA), Digital Mobile Radio (DMR), and other Land Mobile Radio (LMR) radio network technologies. It should be apparent to one skilled in the art that other components of voice communication network 101 are not shown for the sake of simplicity.

Data communication network 120 includes one or more data communication devices 122-128, including video console 128. Data communication devices 122-126 may be, for example, smart phones, laptops, or other similar portable or mobile data communication devices. Video console 128 may be, for example, a computer aided dispatch station, a video console, a video surveillance monitoring station, or a similar fixed data communication device. Users of data communication devices 122-128 may communicate with each other directly or through a repeater functionality (not shown) provided by data communication network 120. Data communication devices 122-128 are used to facilitate multimedia sessions between one or more users. Examples of multimedia content provided in multimedia sessions include audio/visual content, such as videos, documents, photos, building plans, white boards, screen sharing, and the like. Multimedia sessions arranged on data communication network 120 may operate in accordance with any standardized or proprietary multimedia communication protocol that allows for identifying sessions, including, but not limited to, Session Initiation Protocol (SIP), H.323, T.120, Real Time Streaming Protocol (RTSP), eXtensible Messaging and Presence Protocol (XMPP), or similar multimedia communication protocols. Data communication network 120 may operate in accordance with any standard or proprietary data communication protocol that allows for communication of multimedia data, including, but not limited to, IEEE 802.3, 802.11, 802.16, Long Term Evolution (LTE), Universal Mobile Telecommunication System (UMTS), Code Division Multiple Access 2000 (CDMA2000), or other data network technologies. It should be apparent to one skilled in the art that other components of data communication network 120 are not shown for the sake of simplicity.

Some data communication devices, for example devices 122-128, are associated with, or operatively coupled to, a respective voice communication device, as shown by lines 132-138. The associations between the data communication devices and the voice communication devices may be defined in different ways. For example, in some embodiments, a data communication device is associated with a voice communication device if both the data communication device and the voice communication device are being operated by the same user. In FIG. 1, data communication device 122 is associated with voice communication device 102, data communication device 124 is associated with voice communication device 104, data communication device 126 is associated with voice communication device 106, and video console 128 is associated with voice console 110. Voice communication device 108 is not associated with any data communication device. It is assumed that an associated voice communication device and data communication device are configured to communicate with each other. This communication may be facilitated by, for example, Bluetooth, Zigbee, 802.11, Infrared, 802.3, or other personal, local, or wide area networking technology. It will also be apparent to one skilled in the art that other components or configurations of system 100 are not shown for the sake of simplicity.

Voice communication devices 102-110 are grouped into a logical talk group. The talk group is used to convey all voice communications relevant to the users of voice communication devices 102-110, and thus is the primary talk group 112 for these users and their associated voice communication devices. In FIG. 1, a voice conversation, denoted by lines 118, is shown between the voice console 110 and members of primary talk group 112. Users of data communication devices 122-128 may participate in a multimedia session. An example multimedia session denoted by lines 130 is shown between data communication devices 122-124 and 128. Voice conversations between participants of the multimedia session 130 are only presented at a subset of the voice communication devices affiliated with primary talk group 112. This subset of voice communication devices is hereafter referred to as a subset talk group, embodied in FIG. 1 as subset talk group 114. Voice communication devices 102-110 may include one or more push-to-talk keys which, when pressed, direct conversation either to the primary talk group or the subset talk group. For example, one or more push-to-talk keys may be associated with initiating conversations on primary talk group 112 and one or more push-to-talk keys may be associated with initiating conversations on subset talk group 114. Conceivably, any key on each voice communication device may be mapped to a primary talk group or subset talk group communication initiation function.

Each voice communication device 102-110 includes a cryptography component for encrypting and decrypting selected voice conversations on selected talk groups. The cryptography component may process one or more encryption algorithms, with each encryption algorithm being identified by an encryption algorithm identifier value and one or more encryption keys, identified by an encryption key identifier value. For example, in the P25 standard, the encryption algorithm identifier is referred to as an ALGID and the encryption key identifier is referred to as a KEYID. In voice communication devices complying with the P25 standard, encryption key identifiers or KEYIDs are stored in keysets. Each keyset specifies an encryption algorithm identifier or ALGID for which the specified encryption keys are valid. Voice communication devices may be configured with multiple keysets. Typically, two keysets are configured where one keyset includes an active encryption algorithm identifier and associated encryption key identifiers, and is typically referred to as the active keyset, and the other keyset includes an inactive encryption algorithm and associated encryption key identifiers, and is typically referred to as the inactive keyset.

Each talk group configured on the voice communication devices is associated with a Storage Location Number (SLN) which is an index into the encryption key identifiers listed in the keysets. Thus, each talk group configured on the voice communication device is typically associated with an active encryption algorithm identifier and encryption key identifier, and an inactive encryption algorithm identifier and encryption key identifier. Typically, the active encryption key algorithm identifier and encryption key identifier are used to encrypt voice streams for transmission, and either of the active or inactive encryption algorithm identifiers and encryption key identifiers may be used to decrypt received voice streams. These encryption algorithm identifier values and encryption key identifier values are typically provisioned in the voice communication devices through a Key Management Facility (KMF), or may be communicated wirelessly to the voice communication devices through an Over-The-Air-Rekeying (OTAR) system. In order to transmit encrypted voice streams to voice communication devices on a given talk group, each voice communication device is configured to encrypt the voice payload with an encryption algorithm and encryption key, typically selected from the active keyset for the SLN designated for the talk group. The voice communication device is then configured to insert an encryption algorithm identifier value and encryption key identifier value into the voice stream that is to be transmitted.

In voice communication systems compatible with the Project 25 (P25) standard, the encryption algorithm identifier field and the encryption key identifier field are conveyed from a transmitting voice communication device to receiving voice communication devices via an ESYNC field which is embedded in selected voice frames. The encryption algorithm identifier field is referred to as the ALGID field, and is eight bits in length. The encryption key identifier field is referred to as the KEYID, and is sixteen (16) bits in length. In some embodiments, a value of zero (0) in the encryption key identifier field is reserved to denote an unencrypted or clear voice stream.

Each voice communication device receiving the encrypted voice stream is configured to decrypt the received voice stream if it can process the encryption algorithm specified by the ALGID and the encryption key identified by the KEYID. Upon decrypting the voice payload, the receiving voice communication device presents the audio to a user. If the receiving voice communication device is not configured to process either the identified encryption algorithm or the identified encryption key for a given talk group, the receiving voice communication device is configured to suppress presentation of the encrypted voice payload and mute its speakers. Thus, the presence or lack of the identified encryption algorithm or encryption key can enable or disable a particular voice communication device from presenting a given voice stream to its user.

In some embodiments, voice communication devices 102-110 are configured to process an encryption algorithm which supports a subset talk group filtering feature with optional voice stream encryption. The identifier for this encryption algorithm is herein referred to as SUBTGRP+*, where the SUBTGRP portion denotes the subset talk group filtering feature and the * portion denotes an optional voice encryption algorithm to be applied to the voice stream. Examples of optional voice encryption algorithms that may be applied to voice streams include the Advanced Encryption Standard (AES) and the Data Encryption Standard (DES).

When associated data communication devices 122-128 are engaged in a multimedia session, voice communication devices 102-106 and 110 are configured to accept a multimedia session identifier, herein referred to as SessionID, from an associated data communication device 122-128. In some embodiments, the SessionID is transferred from an associated data communication device to a voice communication device at the start of a multimedia session. In other embodiments, the SessionID may be transferred at some arbitrary time offset within the multimedia session. This latter case can accommodate voice and/or data communication devices which are not configured at the start of the multimedia session. This may happen if, for example, the associated data communications device is powered on after the start of the multimedia session, and subsequently joins the session after it has commenced. Accordingly in FIG. 1, each of voice communication devices 102, 104, 106, and 110 are configured to accept the SessionID from the associated data communication devices 122, 124, 126, and 128 via a communication path which exists between the two devices. A predefined subset of the bits used to indicate the SessionID will be used to uniquely identify the multimedia session. Because voice communication devices 102-106 and 110 are configured to process the SUBTGRP+* encryption algorithm, these voice communication devices are also configured to transform the SessionID into a predefined number of bits, for example by selecting the twelve most significant bits, to uniquely identify the associated multimedia session. This subset of the SessionID is herein known as the SessionKeyID. The transformation may be by way of truncation, hash, or other means known in the art. The number of and positions of bits extracted from the SessionID field to generate the SessionKeyID is configurable based on the size of a key identifier field used in signaling and a number of unique voice encryptions keys anticipated to be provisioned for optional voice encryption. In some embodiments not requiring voice encryption for subset talk group conversations, the number of bits reserved to indicate the voice encryption key may be zero. In some embodiments, information for transforming the SessionID into the SessionKeyID may be specified by the configured SUBTGRP+* encryption algorithm used for all subset talk group conversations on a given primary talk group, thus ensuring that all voice communication devices supporting a given SUBTGRP+* encryption algorithm use a mutually agreed upon transformation.

Skilled artisans will appreciate that in some embodiments, the selection, extraction, and transformation of bits from the SessionID field to form the SessionKeyID may also be performed by the data communication devices, an infrastructure device, an entity serving the data communication devices, or by an intermediary between a data communication device and a voice communication device. In an alternate embodiment, a video controller could, for example, perform the transformation and provide the transformed value, along with other multimedia session data, to the data communication devices, which would in turn pass the transformed value to their associated voice communication device.

If the selected encryption algorithm indicates that the voice stream associated with the subset talk group is to be encrypted, voice communication devices 102-106 and 110 are configured to obtain a suitable voice encryption key identifier, hereafter known as the VoiceEncryptionKeyID. The VoiceEncryptionKeyID is used to indicate which encryption key is used to encrypt the voice stream. In some embodiments, the VoiceEncryptionKeyID, and the actual encryption keys identified by the VoiceEncryptionKeyID, are distributed to the voice communication devices prior to the start of a multimedia communications session, using an existing key management facility. As previously noted, in some embodiments, a reserved value of zero (0) for the VoiceEncryptionKeyID implies no encryption of the voice stream. The SessionID which identifies the multimedia session is transferred to voice communication devices, for example devices 102, 104, 106 and 110, at the time multimedia session 130 is setup via a collaborating and paired data communication device engaged in multimedia session 130, for example devices 122, 124, and 128. After transformation of the SessionID into a SessionKeyID, voice communication devices 102-106 and 110 are configured to combine the VoiceEncryptionKeyID with the SessionKeyID to dynamically generate a new value, herein referred to as the SignalingKeyID. The generated SignalingKeyID, along with a configured SUBTGRP+* encryption algorithm identifier supporting a subset talk group filtering feature, is subsequently signaled as the encryption key identifier and encryption algorithm identifier, respectively, when voice streams are directed to a subset talk group 114. Therefore, only receiving voice communication devices 102-106 and 110, which are part of the same primary talk group 112, which have received the same SessionID from a collaborating data communication device, and which have been configured to process a matching SUBTGRP+* encryption algorithm identifier and VoiceEncryptionKeyID (if the voice stream is to be encrypted), will be able to generate the same SignalingKeyID, decrypt (if applicable) the voice streams, and present the voice streams associated with a multimedia session to an associated end user. Other voice communication devices which are part of primary talk group 112, for example voice communication devices 106-108, which cannot process the VoiceEncryptionKeyID or the SUBTGRP+* encryption algorithm identifier, or which have not been provided the same SessionID from a collaborating data communication device, suppress presentation of the incoming voice stream.

Figure 5:
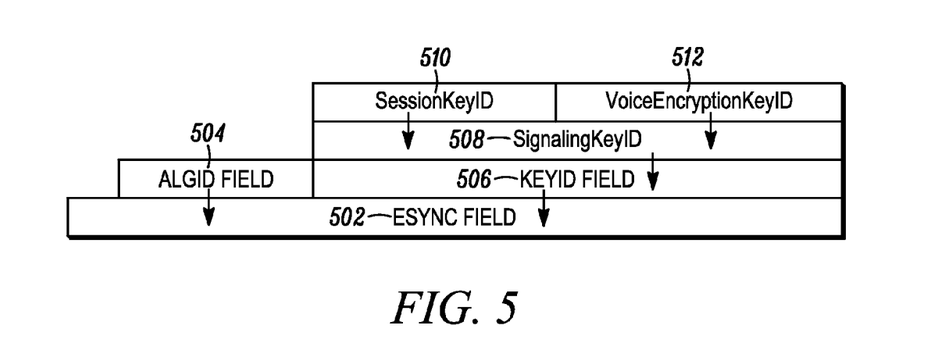
FIG. 5 is a block diagram of signaling elements used in accordance with some embodiments.

FIG. 5 is a block diagram that shows the mapping between the values used in some embodiments and the signaling used in the P25 standard to indicate encryption algorithm identifiers and encryption key identifiers. In particular, FIG. 5 illustrates an example of a P25 ESYNC field 502 configured for subset talk group communication. The P25 ESYNC field 502 typically includes a P25 ALGID field 504 and a P25 KEYID field 506. As is known to those skilled in the art, P25 ESYNC field 502 is a ninety six (96) bit field, wherein eight (8) bits are used for ALGID field 504 to indicate the encryption algorithm identifier and sixteen bits (16) are used for P25 KEYID field 506 to indicate the encryption key identifier. When ESYNC field 502 is configured for subset talk group communication, the value of ALGID field 504 may be set to SUBTGRP+*. When ESYNC field 502 is configured for subset talk group communication, a SignalingKeyID field 508 may be used as the KEYID field 506. Therefore, FIG. 5 shows the SignalingKeyID value 508 over KEYID field 506. SignalingKeyID 508 is a sixteen (16) bit value generated by performing a logical OR operation on a SessionKeyID value 510 and a VoiceEncryptionKeyID value 512. As noted above, the SessionKeyID is obtained from a transformed SessionID sent from an associated data communication device. When the twelve most significant bits are extracted from the SessionID, four bits are left in the SignalingKeyID for the VoiceEncryptionKeyID.

Figure 2:
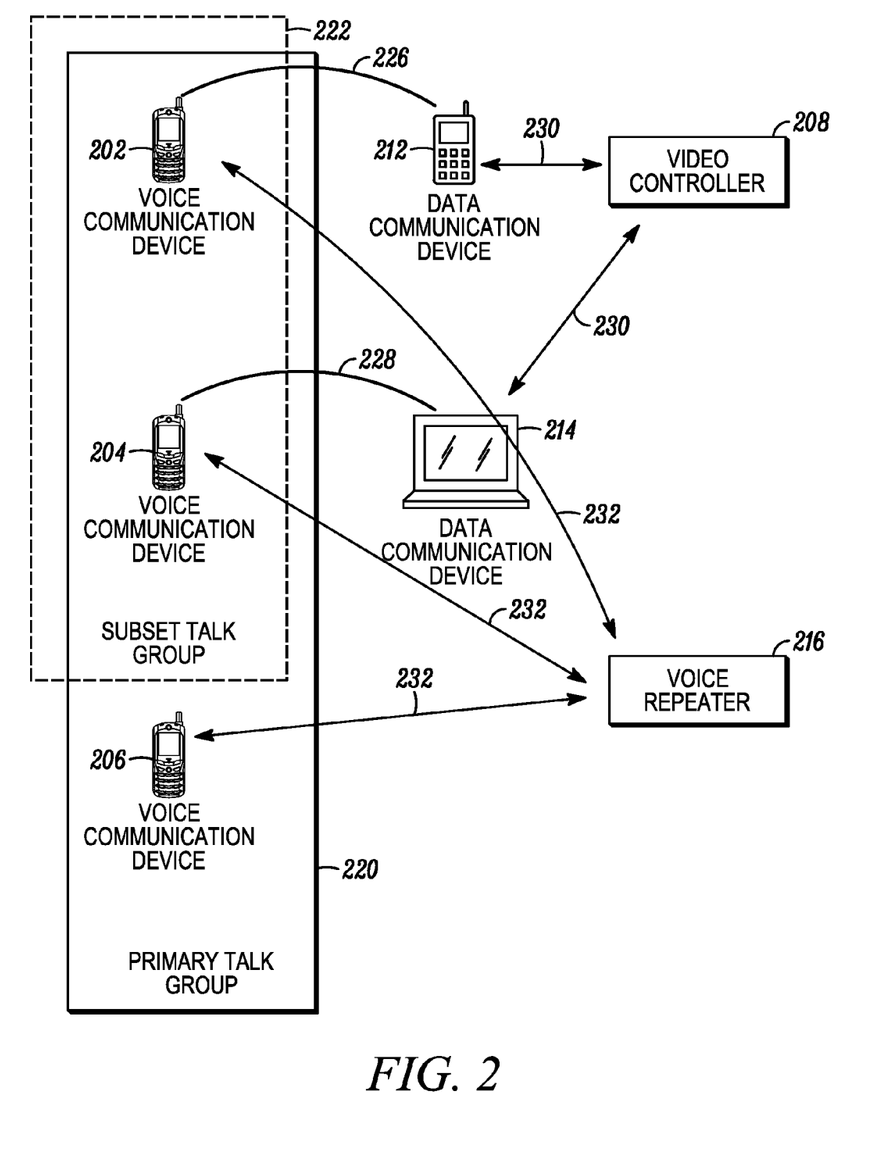
FIG. 2 is a block diagram of components used to transmit voice conversation related to a multimedia session in accordance with some embodiments.

FIG. 2 is a block diagram of components used to transmit voice streams related to a multimedia session in accordance with some embodiments. Voice communication devices 202-206 are all members to primary talk group 220. Voice communication devices 202 and 204 which are associated with data communication devices 212 and 214, respectively, are configured to process an encryption algorithm which supports a subset talk group filtering feature. For example, voice communication devices 202 and 204 are configured to process an encryption algorithm associated with a SUBTGRP+CLR encryption algorithm identifier, wherein the SUBTGRP+ portion of the encryption algorithm identifier denotes the subset talk group filtering feature and the CLR portion denotes the lack of actual encryption of the voice stream. Hence, the SUBTGRP+CLR algorithm identifier indicates that the voice streams transmitted on the subset talk group are unencrypted. Although the voice streams are unencrypted, the SUBTGRP+CLR encryption algorithm identifier inherently allows voice communication devices 202-206 to filter voice streams associated with the subset talk group 222. Therefore, commands associated with the SUBTGRP+CLR algorithm identifier may be implemented in software on existing processing resources, with or without the aid of a hardware cryptography processor. It should be noted that although voice communication device 206 is not associated with a data communication device, users of voice communication device 206 may still communicate, at any time, with users of voice communication devices 202 and 204 in a non-subset talk group session, for example a dispatch talk group session on the primary talk group 220.

At the start of or during a multimedia session, for example a video session denoted by lines 230, video controller 208 distributes a session identifier (SessionID) for video session 230 to data communication devices 212 and 214 associated with video session 230. Upon receipt of the SessionID, data communication devices 212 and 214 perform the setup to facilitate the transfer of the multimedia content. Each data communication device 212 and 214 transfers the SessionID to the associated voice communication device 202 and 204 by way of a personal area network or other connecting network denoted by lines 226 and 228, respectively. Upon receipt of the SessionID, each voice communication device 202 and 204 transforms the SessionID into a SessionKeyID by way of a transformation mutually agreed upon by all voice communication devices in the subset talk group 222. Each voice communication device 202 and 204 then determines if it is configured to process the SUBTGRP+CLR encryption algorithm, identified by the SUBTGRP+CLR encryption algorithm identifier value. Because the SUBTGRP+CLR identifier denotes that the actual voice stream is not to be encrypted, an associated VoiceEncryptionKeyID value is set to zero. When voice communication devices 202 and 204 process the SUBTGRP+CLR encryption algorithm, they logically OR together the values of the SessionKeyID with the value (in this case zero) of the VoiceEncryptionKeyID to generate the SignalingKeyID value. The SignalingKeyID value is thereafter embedded along with the subset talk group voice stream when the voice stream denoted by lines 232 is transmitted from one voice communication device to other voice communication devices affiliated to the same primary talk group 220.

When a user of a voice communication device involved in the multimedia session 230, for example a user of voice communication device 202, depresses a push-to-talk button on voice communication device 202, voice communication device 202 is configured to transmit an unencrypted voice stream 232 associated with the multimedia session 230 and subset talk group 222 to all communication devices in the primary talk group 220, specifically voice communication devices 204 and 206 in this example. An encryption synchronization field (for example, ESYNC) associated with the voice stream is set to include the encryption algorithm identifier value for the SUBTGRP+CLR encryption algorithm (for example, in the ALGID component of the ESYNC field) and the generated SignalingKeyID value (for example, in the KEYID component of the ESYNC field). Voice streams 232 sent from each voice communication device 202, 204 and 206 may be transmitted to a voice repeater 216, or similar infrastructure device, before being transmitted to receiving voice communication devices.

Upon receiving the voice stream 232, a receiving voice communication device, for example device 204, is configured to examine the encryption synchronization field (for example, ESYNC) and match the SUBTGRP+CLR encryption algorithm identifier value (specified in, for example, the ALGID component of the ESYNC field) and the generated SignalingKeyID value (specified in, for example, the KEYID component of the ESYNC field) with information previously generated and stored on voice communication device 204. Upon matching the SUBTGRP+CLR encryption algorithm identifier value and the SignalingKeyID value, voice communication device 204 is configured to un-mute its audio speaker and present the voice conversation to an associated end user. Because voice communication device 206 is also affiliated to primary talk group 220, the voice stream 232 is also sent to voice communication device 206. Because voice communication device 206 is not part of the multimedia subset talk group 222, however, voice communication device 206 will examine the received encryption synchronization field, but fail to process a matching SignalingKeyID value as the SessionID component was not supplied by a collaborating data communication device. Voice communication device 206 will consequently keep its speaker muted during the multimedia subset talk group 222 conversation, as mandated by existing standards for decoding of encrypted audio when a matching SignalingKeyID value is not found in a local key storage repository.

After receiving the voice transmission from voice communication device 202, the operator of voice communication device 204 may respond within some period of time defined by the system. In some embodiments, when voice communication device 204 receives a voice stream from voice communication device 202 with an encryption synchronization field indicating a subset talk group conversation, voice communication device 204 may be configured to interpret a subsequent push-to-talk request as a request to transmit a voice stream to the same subset talk group, following the above procedures, regardless of whether the primary or secondary push-to-talk button was pressed.

In addition to transmitting voice streams associated with multimedia sessions, voice communication devices 202, 204, and 206 may at any time initiate a standard unencrypted or encrypted voice call, which all voice communication devices in, for example a primary talk group 220, are configured to decode and present to the associated users.

When the multimedia session ends, video controller 208 is configured to issue an end-of-session directive, causing the collaborating data communication devices 212 and 214 to direct their collaborating voice communication devices 202 and 204 to clear the SessionKeyID component used to generate the SignalingKeyID used for subset talk group communications.

In some embodiments, voice communication devices 202 and 204, are configured to process encrypted voice streams related to a multimedia session. For example, voice communication devices 202 and 204 are configured to process a SUBTGRP+AES encryption algorithm, wherein the SUBTGRP+ portion of the encryption algorithm identifier denotes the subset talk group filtering feature and the AES portion denotes a voice encryption algorithm to be applied to the voice stream. It should be apparent to one skilled in the art that other voice encryption algorithms may be used in accordance with some embodiments. Voice communication devices 202 and 204 are also provided, using standard key management mechanisms, with a voice encryption key, identified by a VoiceEncryptionKeyID, for encrypting voice data on the subset talk group. This may be in addition to an encryption algorithm and encryption key identifier specified for encrypting voice conversation on the primary talk group.

At the start of or during a multimedia session where voice communications related to the multimedia session must remain secure, for example an encrypted video session 230, video controller 208 distributes the SessionID for the video session to data communication devices 212 and 214 associated with the video session. Upon receipt of the SessionID, data communication devices 212 and 214 perform the setup to facilitate the transfer of video content. Each data communication device 212 and 214 transfers the SessionID to the associated voice communication device 202 and 204 by way of a personal area network or other connecting network 226 and 228, respectively. Upon receipt of the SessionID, each voice communication device 202 and 204 transforms the SessionID into a SessionKeyID value by way of a transformation mutually agreed upon by all voice communication devices in the subset talk group 222. Each voice communication devices 202 and 204 then determines if it is configured to process the SUBTGRP+AES algorithm. In particular, each voice communication device 202 and 204 retrieves a VoiceEncryptionKeyID value specified for use on subset talk groups of primary talk group 220. Voice communication devices 202 and 204 are configured to logically OR together the values of the SessionKeyID with the value of the VoiceEncryptionKeyID to produce the SignalingKeyID value to be used for over-the-air signaling.

When the user of voice communication device, for example device 202, depresses a push-to-talk button associated with the multimedia subset talk group feature, voice communication device 202 is configured to begin encrypting and transmitting a voice stream 232, with the encryption synchronization field, for example ESYNC, set to include the SUBTGRP+AES encryption algorithm identifier value (for example, in the ALGID component of the ESYNC field) and the value of the generated SignalingKeyID field (for example, in the KEYID component of the ESYNC field). Upon receiving the voice stream 232 and matching the SUBTGRP+AES algorithm identifier value and SignalingKeyID value with information previously generated and stored on a receiving voice communication device, for example device 204, voice communication device 204 is configured to decrypt the voice stream 232, un-mute its speaker and present the audio to the end user. Upon receiving the voice stream 232, voice communication device 206 is also configured to examine the encryption synchronization field, but voice communication device 206 will fail to find a matching SignalingKeyID value as the necessary SessionID component was not supplied by a collaborating data device. Voice communication device 206 will consequently keep its speaker muted during this subset talk group conversation.

In addition to transmitting voice streams associated with multimedia sessions, voice communication devices 202, 204, and 206 may at any time transmit unencrypted or encrypted voice calls which all voice communication devices 202, 204, and 206 affiliated to the primary talk group can present to associated users.

When the multimedia session ends, video controller 208 is configured to issue an end-of-session directive, causing the collaborating data communication devices 212 and 214 to direct their collaborating voice communication devices 202 and 204 to clear the SessionID component used to generate the SignalingKeyID used for subset talk group communications.

Embodiments support multiple active and discrete subset talk group conversations without affecting the primary talk group. Because the SessionKeyID is unique to each multimedia session, the same encryption algorithm, for example SUBGRP+AES, and an applicable voice encryption key may be used for all subset talk group sessions on a given primary talk group, with the SessionKeyID value generating a unique SignalingKeyID value for each subset talk group session. In this way, multiple subset talk group sessions, each associated with a different multimedia session, may be active on the same primary talk group. One skilled in the art will appreciate that multiple encryption algorithms and voice encryption keys may be configured for subset talk groups in the same way as they are configured for standard talk groups (for example, primary talk groups). As per standard behavior for a voice communication device supporting cryptography, a user operating the voice communication device may select between available encryption algorithms supporting the subset talk group filtering feature, for example, SUBTGRP+CLR or SUBTGRP+AES via a knob or other mechanism to indicate a run-time preference for unencrypted or encrypted voice conversations on the subset talk group. Additionally, one encryption algorithm and/or voice encryption key may be designated as "active" for subset talk group conversations on a given primary talk group. When transmitting a voice stream on a subset talk group, a voice communication device will typically use the active encryption algorithm and encryption key unless instructed otherwise. Receiving voice communication devices may be configured to match receiving subset talk group voice streams against any configured encryption algorithm or key, or against only algorithms and keys identified for the primary talk group, or against only the encryption algorithm and key identified as "active" for the primary talk group, or against only the encryption algorithm and key identified as "active" for subset talk group conversations on a given primary talk group.

Unlike existing means which either broadcast discussion of multimedia content to uninterested parties, or which may remove users from their primary talk groups, the embodiments disclosed herein use voice services offered by voice communication systems, without altering existing workflow on the voice communication systems.

Figure 3:
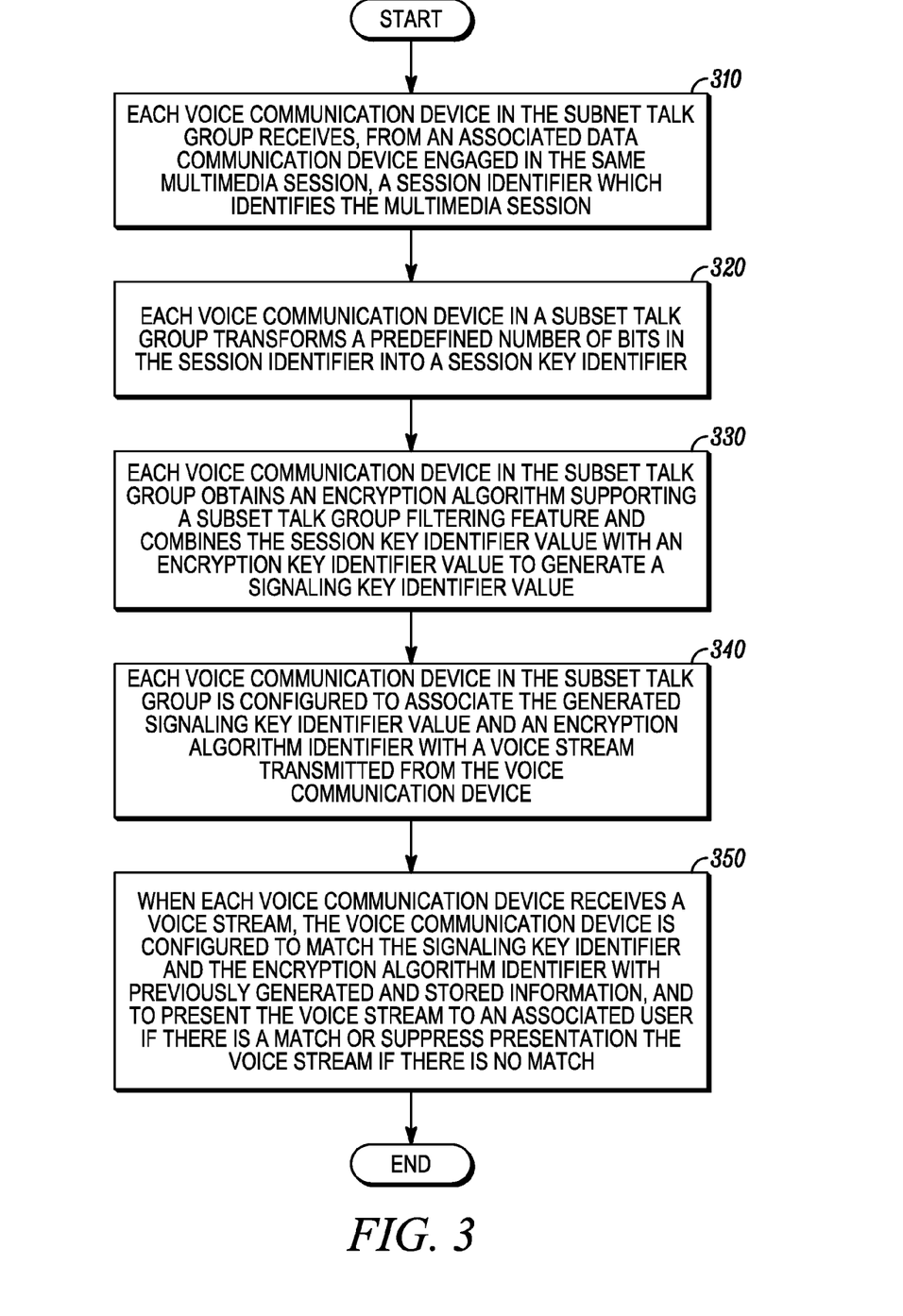
FIG. 3 is a flowchart of a method for transmitting voice conversation related to a multimedia session in accordance with some embodiments.

FIG. 3 is a flowchart of a method for transmitting voice conversation related to a multimedia session in accordance with some embodiments. In 310, each voice communication device in the subset talk group receives, from an associated data communication device engaged in the same multimedia session, a session identifier which identifies the multimedia session. In 320, each voice communication device in the subset talk group transforms the session identifier into a session key identifier. In 330, each voice communication device in the subset talk group obtains an encryption algorithm supporting a subset talk group filtering feature and combines the session key identifier value with an encryption key identifier value to generate a signaling key identifier value. In 340, each voice communication device in the subset talk group is configured to associate the generated signaling key identifier value and an encryption algorithm identifier with a voice stream transmitted from the voice communication device. In 350, when each voice communication device receives a voice stream, the voice communication device is configured to match the signaling key identifier and the encryption algorithm identifier with previously generated and stored information, and to present the voice stream to an associated user if there is a match or suppress presentation of the voice stream if there is no match.

Figure 4:
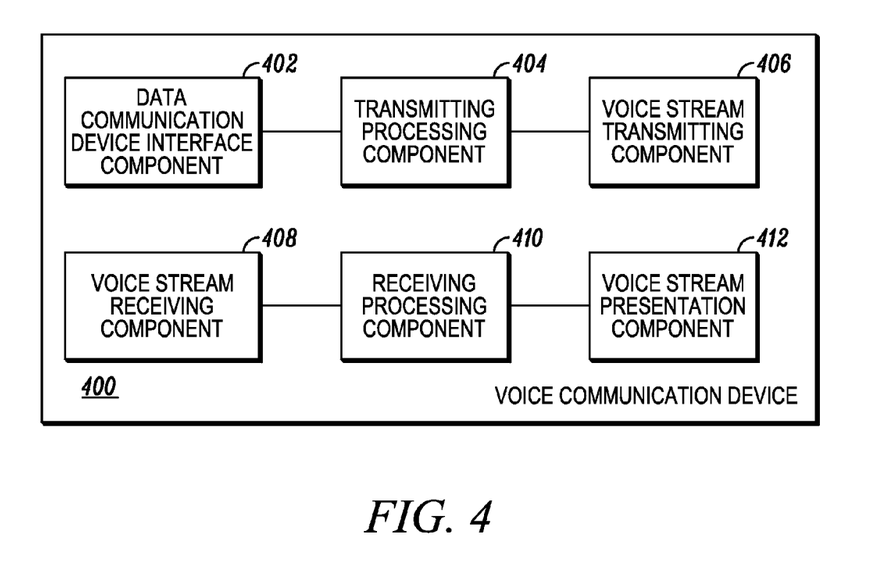
FIG. 4 is a block diagram of a voice communication device used in accordance with some embodiments.

FIG. 4 is a block diagram of components of a voice communication device 400 in accordance with some embodiments. Voice communication device 400 includes an associated data communication interface component 402 configured to receive a session identifier at the start of or during a multimedia session from an associated data communication device. The session identifier is used to identify the multimedia session. Voice communication device 400 also includes a transmitting processing component 404 which is configured to transform a predefined number of bits in the session identifier into a session key identifier value, to obtain or recall an encryption algorithm supporting a subset talk group filtering feature, to obtain or recall, if appropriate, a voice encryption key identifier, to combine the session key identifier value with a voice encryption key identifier value to produce a signaling key identifier value, and to optionally encrypt the voice stream. Voice communication device 400 also includes a voice stream transmitting component 406 which is configured to transmit the signaling key identifier and an encryption algorithm identifier with a voice stream to other voice communication devices. Voice communication device 400 also includes a voice stream receiving component 408 which receives voice streams from other voice communication devices operating on the same talk group. Voice communication device 400 also includes a receiving processing component 410 which is configured to match the signaling key identifier and the encryption algorithm identifier with previously generated and stored information, and decrypt the voice stream if required. Voice communication device 400 also includes a voice stream presentation component 412 which is configured to present the received voice stream to an associated user if there is a match or suppress presentation of the voice stream if there is no match. It should be apparent to one skilled in the art that the functions of one or more of the components noted above may be combined. Therefore, communication device 400 may be configured in ways different from that noted above. It should thus be apparent to one skilled in the art that other components or configurations of communication device 400 are not shown for the sake of simplicity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transmitting a subset voice stream associated with a subset talk group that is subset of a primary talk group, comprising:
   receiving, by a user voice communication device of the subset talk group, from an associated user data communication device engaged in a multimedia session, a session identifier that uniquely identifies a multimedia session, wherein the associated user data communication device is not a part of the primary talk group;
   transforming the session identifier into a session key identifier;
   obtaining, by the user voice communication device from an internal or external storage, an encryption algorithm supporting a subset talk group filtering feature and a voice encryption key identifier of the encryption algorithm,
   combining the session key identifier with the voice encryption key identifier to generate a signaling key identifier; and
   associating, by the user voice communication device, the signaling key identifier and an encryption algorithm identifier of the encryption algorithm with the subset voice stream during transmission of the subset voice stream to a receiving user voice communication device, wherein upon receipt of the subset voice stream, the receiving user voice communication device is configured to match the signaling key identifier and the encryption algorithm identifier with information stored on internal or external storage associated with the receiving user voice communication device, and to present the subset voice stream to an associated user if there is a match or suppress presentation of the subset voice stream if there is no match.

2. The method of claim 1, wherein the voice encryption key identifier denotes either a lack of encryption on the subset voice stream or an encryption key used to encrypt the subset voice stream.

3. The method of claim 1, wherein the encryption algorithm identifier denotes that the receiving user voice communication device is to filter or decrypt and filter the subset voice stream.

4. The method of claim 1, further comprising transmitting, by the user voice communication device, the subset voice stream when an input key associated with the subset talk group is activated on the user voice communication device.

5. The method of claim 4, wherein the associating comprises setting an encryption synchronization field transmitted with the subset voice stream to include the signaling key identifier and the encryption algorithm identifier.

6. The method of claim 5, wherein upon receipt of the subset voice stream, the receiving user voice communication device is configured to provide a response, wherein the response is transmitted to the user voice communication device according to information in the encryption synchronization field.

7. The method of claim 1, wherein the transforming comprises at least one of a hash operation or a truncation operation.

8. The method of claim 1, wherein the receiving comprises receiving the session identifier when the user voice communication device is associated with the multimedia session.

9. The method of claim 1, wherein the transforming is performed by at least one of the user data communication device, the user voice communication device, an infrastructure device, or an intermediary device between the user data communication device and the user voice communication device in a manner that is mutually accepted by the voice communication device and receiving voice communication devices.

10. The method of claim 1, wherein the obtaining comprises obtaining the session key identifier which is generated during the multimedia session and the voice encryption key identifier which is stored on the internal or external storage prior to the start of the multimedia session and the combining comprises combining the session key identifier with the voice encryption key identifier to generate the signaling key identifier.

11. The method of claim 1, wherein the associating comprises encrypting the subset voice stream according to the encryption algorithm and the voice encryption key and embedding the signaling key identifier and the encryption algorithm identifier with the subset voice stream.

12. A voice communication device associated with a subset talk group that is subset of a primary talk group, comprising:
a receiving component configured to receive a session identifier, the session identifier identifying a multimedia session;
a processing component configured to:
transform the session identifier into a session key identifier,
obtain, from an internal or external storage, an encryption algorithm that supports a subset talk group filtering feature and a voice encryption key identifier of the encryption algorithm, and
combine the session key identifier with the voice encryption key identifier
to generate a signaling key identifier; and
a transmitting component configured to transmit the signaling key identifier and an encryption algorithm identifier of the encryption algorithm with a subset voice stream to a receiving voice communication device,
wherein upon receipt of the subset voice stream the receiving voice communication device is configured to match the signaling key identifier and the encryption algorithm identifier with information stored on an internal or external storage associated with the receiving voice communication device, and to present the subset voice stream to an associated user if there is a match or suppress presentation of the subset voice stream if there is no match.

13. The voice communication device of claim 12, wherein the voice encryption key identifier denotes either a lack of encryption on the subset voice stream or an encryption key used to encrypt the subset voice stream.

14. The voice communication device of claim 12, wherein the encryption algorithm identifier denotes that the receiving voice communication device is to filter or decrypt and filter the subset voice stream.

15. The voice communication device of claim 12, wherein the transmitting component is configured to transmit the subset voice stream when an input key associated with the subset talk group is activated on the voice communication device.

16. The voice communication device of claim 12, wherein the transmitting component is configured to set an encryption synchronization field transmitted with the subset voice stream to include the signaling key identifier and the encryption algorithm identifier.

17. The voice communication device of claim 16, wherein upon receiving the subset voice stream, the receiving voice communication device is configured to provide a response, wherein the receiving component is configured to receive the response which is transmitted according to information in the encryption synchronization field.

18. The voice communication device of claim 12, wherein the processing component is configured to transform the session identifier using at least one of a hash operation or a truncation operation.

19. The voice communication device of claim 12, wherein the processing component is configured to encrypt the subset voice stream according to the encryption algorithm and the voice encryption key and to embed the signaling key identifier and the encryption algorithm identifier with the subset voice stream.

20. A system comprising:
a plurality of user data communication devices of a data communication network engaged in a multimedia session;
a plurality of user voice communication devices of a voice communication network engaged in a voice communication session as a primary talk group;
a subset of the primary talk group, the subset comprising at least one user voice communication device of the plurality of user voice communication devices, the at least one user voice communication device configured to:
receive a session identifier from at least one device from the plurality of user data communication devices, wherein the session identifier uniquely identifies the multimedia session,
transform the session identifier into a session key identifier,
obtain, from an internal or external storage, an encryption algorithm supporting a subset talk group filtering feature and a voice encryption key identifier,
combine the session key identifier with the voice encryption key identifier to generate a signaling key identifier,
transmit the signaling key identifier and an encryption algorithm identifier with a subset voice stream to a receiving user voice communication device,
wherein upon receipt of the subset voice stream the receiving user voice communication device is configured to match the signaling key identifier and the encryption algorithm identifier with information stored on an internal or external storage associated with the receiving user voice communication device, and to present the subset voice stream to an associated user if there is a match or suppress presentation of the subset voice stream if there is no match.

\* \* \* \* \*

UNITED STATES PATENT AND TRADEMARK OFFICE
CERTIFICATE OF CORRECTION

PATENT NO.      : 8,681,981 B2
APPLICATION NO. : 12/959442
DATED           : March 25, 2014
INVENTOR(S)     : Bekiares et al.

It is certified that error appears in the above-identified patent and that said Letters Patent is hereby corrected as shown below:

On the title page

On Page 2, item 56, under "OTHER PUBLICATIONS", in Column 2, Line 1, delete "WO 2005101697 A1 10/2005".

On Page 2, item 56, under "OTHER PUBLICATIONS", in Column 2, Line 3, delete "WO 2009032089 A1 3/2009".

On Page 2, item 56, under "OTHER PUBLICATIONS", in Column 2, Lines 7-9, delete "Bian, J. et al., "A role based-secure group communication framework," IEEE International Conference on System of Systems Engineering, pp. 1-6, Jun. 2008.".

In the drawings

In Fig. 3, Sheet 3 of 4, in Box "310", in Line 1, delete "SUBNET" and insert -- SUBSET --, therefor.

In the specification

In Column 1, Line 58, delete "data. communication" and insert -- data communication --, therefor.

Signed and Sealed this
Third Day of May, 2016

Michelle K. Lee
*Director of the United States Patent and Trademark Office*